United States Patent [19]

Paradis, IV

[11] Patent Number: 4,658,926

[45] Date of Patent: Apr. 21, 1987

[54] SEAL FOR AIR CUSHION VEHICLE

[75] Inventor: John B. Paradis, IV, Panama City, Fla.

[73] Assignee: The United States of America as represented by the Secretary of the Navy, Washington, D.C.

[21] Appl. No.: 700,151

[22] Filed: Feb. 11, 1985

[51] Int. Cl.⁴ .................................................. B60V 1/04
[52] U.S. Cl. .................................. 180/126; 114/67 A
[58] Field of Search ............... 180/126, 124, 125, 127, 180/128, 116, 117, 118; 114/67 A; 244/100 A; 104/23 FS; 414/635, 636; 277/34 R

[56] References Cited

U.S. PATENT DOCUMENTS

| | | | |
|---|---|---|---|
| 3,272,272 | 9/1966 | Hall et al. | 180/128 X |
| 3,410,241 | 11/1968 | Hardy | 114/67 A |
| 3,424,266 | 1/1969 | Cockerell | 180/118 |
| 3,913,704 | 10/1975 | Eggington | 180/124 X |
| 4,000,710 | 1/1977 | Crago | 114/67 A |
| 4,137,987 | 2/1979 | Plackett | 180/126 |
| 4,215,756 | 8/1980 | Hunt | 180/127 |
| 4,285,414 | 8/1981 | Malakhoff | 180/126 |
| 4,436,312 | 3/1984 | Davis et al. | 114/67 A X |

FOREIGN PATENT DOCUMENTS 224081 12/1968 Sweden ............................. 180/127
1423656 2/1976 United Kingdom ............... 180/127

Primary Examiner—John J. Love
Assistant Examiner—Mitchell J. Hill
Attorney, Agent, or Firm—Robert F. Beers; Ervin F. Johnston

[57] ABSTRACT

An improved seal is provided for an air cushion vehicle which has side hulls and a wet deck therebetween. The improved seal includes a flexible sheet like device which is connected to the wet deck and which extends between the side hulls so as to present a forward surface. A plurality of elongated flexible panels are connected to the air cushion vehicle and extend downwardly across the forward surface of the flexible sheet like device, and elongated panels laterally overlap one another so as to provide a continuous field barrier across the vehicle. With this arrangement the panels cooperatively flex and slide with respect to one another to discretely respond to wave actions, thereby minimizing drag and wear capabilities of the seal.

11 Claims, 20 Drawing Figures

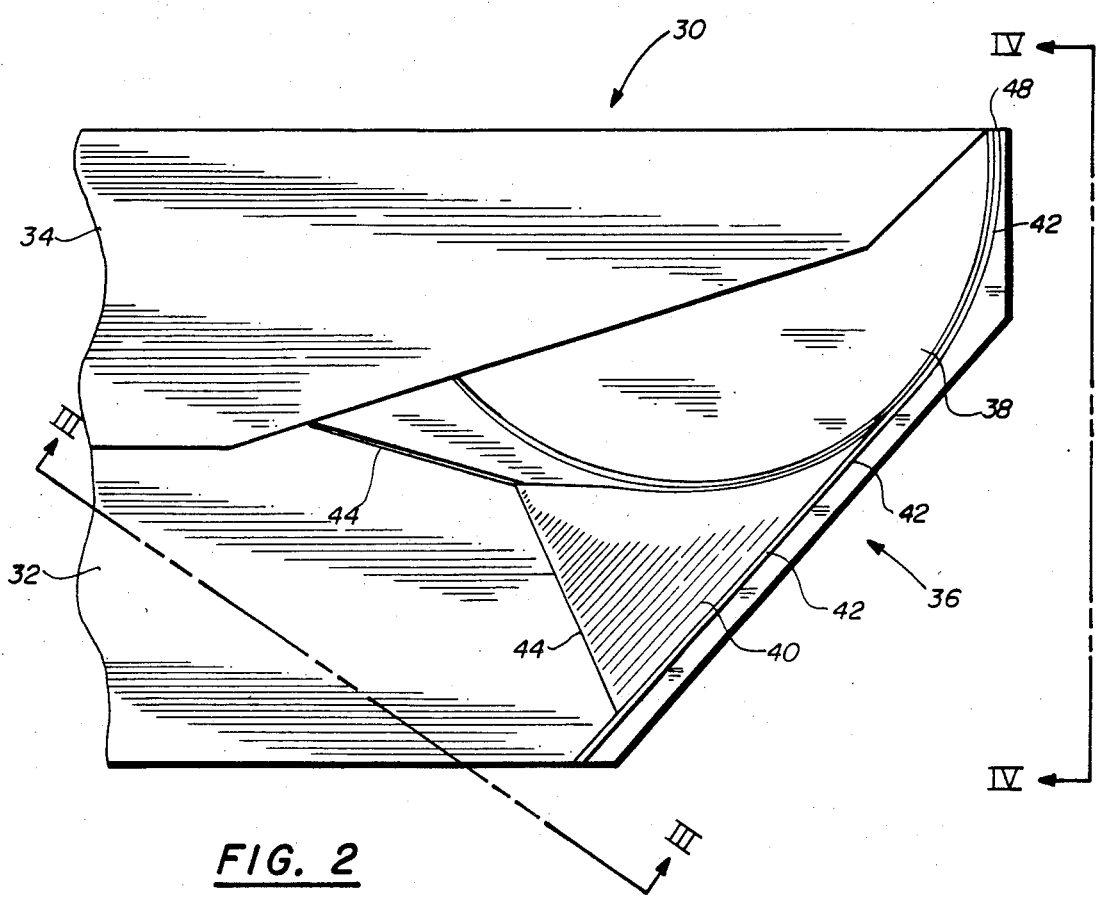
FIG. 2
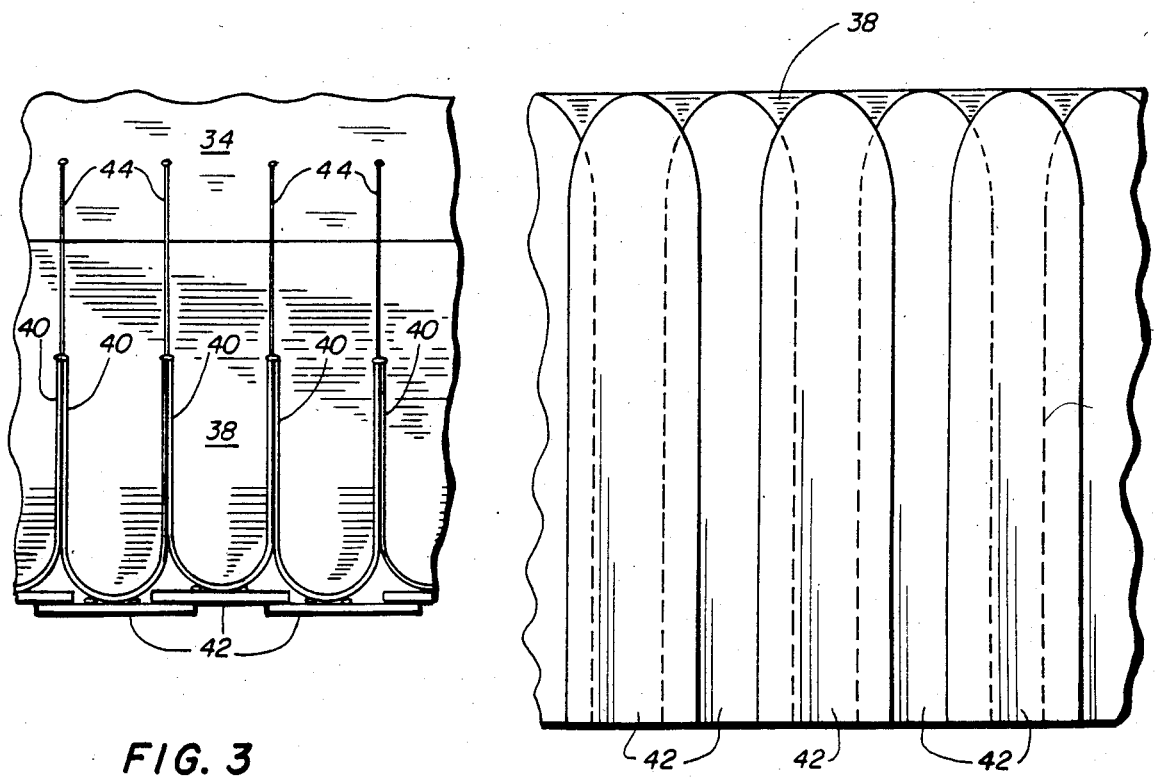
FIG. 3
FIG. 4

SEAL FOR AIR CUSHION VEHICLE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to an improved seal for an air cushion vehicle.

The U.S. Navy has undertaken a considerable amount of research on the surface effect ship (SES) which is characterized by its hard catamaran like side hulls with bow and stern seals. With this arrangement, an air cushion is obtainable between the side hulls and the seals for positioning the vehicle above the surface of the water.

There have been various designs of bow and stern seals ranging from fully flexible seals to partially rigid seals. Various embodiments of bow and stern seals are illustrated in the following patents: U.S. Pat. No. 4,137,987 to Plackett; U.S. Pat. No. 4,215,756 to Hunt; U.S. Pat. No. 4,285,414 to Malakhoff et al; U.S. Pat. No. 3,410,241 to Hardy et al; U.S. Pat No. 3,424,266 to Cockerell; and U.S. Pat. No. 4,000,710 to Crago. The purposes of a bow or stern seal are: (1) to minimize leakage from the pressurized air cushion region to the atmosphere and thereby minimize cushion air flow power requirements; (2) absorb wave impacts and thereby reduce structural loads; and (3) provide restoring forces to maintain pitch stability.

In order to prevent excessive leakage of cushion air to the atmosphere it is necessary that a bow or stern seal follow the high frequency smaller wave surfaces as well as the larger wave surfaces. This requires that the lower end of the seal be made of some highly flexible material. However, because of the highly dynamic environment at the lower end of the seal the flexible material rapidly wears so that replacement becomes a large factor in the operational cost and durability of the surface effect vehicle. There is a need for a flexible seal which is configured to minimize wear due to wave action, and yet be able to minimize drag during operation of the surface effect vehicle.

SUMMARY OF THE INVENTION

The invention is an improved seal for a surface effect or air cushion vehicle wherein the vehicle has side hulls and a wet deck therebetween. The improved seal includes a flexible sheet like device which is connected to the wet deck and which extends between the side hulls so as to present a forward surface. A plurality of elongated flexible panels are connected to the air cushion vehicle. These panels extend downwardly across the forward surface of the flexible sheet like device and laterally overlap one another so as to provide a continuous sealed barrier across the vehicle. With this arrangement the panels cooperatively flex and slide with respect to one another to discretely respond to wave actions, thereby minimizing drag and wear.

OBJECTS OF THE INVENTION

An object of the present invention is to overcome the aforementioned problems associated with prior art seals for air cushion vehicles.

Another object is to provide an improved seal for land or water air cushion vehicles.

A further object is to provide an improved seal for a surface effect vehicle wherein the seal is flexible, and yet is able to undergo minimum wear under all wave surface conditions.

Yet another object is to provide an air cushion vehicle with a flexible seal which operates with a minimum of wear and drag.

Still another object is to provide an easy to construct and low cost seal for an air cushion vehicle wherein the seal is flexible enough to follow all sizes of waves to minimize leakage, and yet is configured to be able to operate in all sizes of waves with a minimum of wear.

These and other objects of the invention will become more readily apparent from the ensuing specification when taken together with the drawings.

DESCRIPTION OF THE DRAWINGS

FIG. 2 is a side view of a bow portion of a surface effect vehicle with the starboard side hull removed to illustrate one embodiment of the invention which is a seal which includes a pneumatic bag, fingers, and full panels.

FIG. 3 is a partial view taken along plane III—III of FIG. 2.

FIG. 4 is a partial view taken along plane IV—IV of FIG. 2.

DESCRIPTION OF THE PREFERRED EMBODIMENTS

Figure 1:
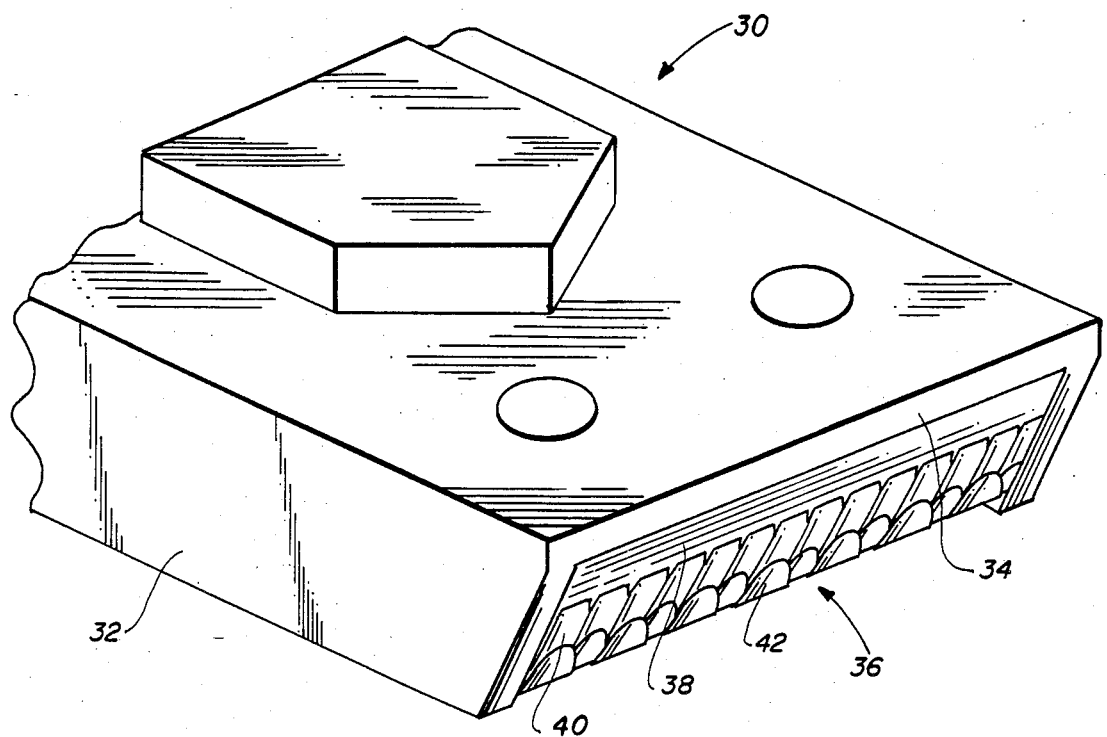
FIG. 1 is an isometric view of a bow portion of a surface effect vehicle illustrating one of the bow seal embodiments (FIG. 8) of the present invention.

FIG. 1 is an isometric illustration whch has some elements which are common to all of the embodiments described in FIGS. 2 through 20. Further, the FIG. 1 illustration is the identical embodiment as that illustrated in FIGS. 8 through 10 which will be described in detail hereinafter.

FIG. 2 illustrates a bow portion 30 of a surface effect vehicle, the bow portion having side hulls 32 which are joined together by a wet deck 34. The bow of the surface effect vehicle 30 is sealed by a seal 36 which includes a pneumatic bag 38, fingers or loops 40, and full length panels 42. The pneumatic bag 38 may be mounted to the bottom of the wet deck 34 and the top edges of the fingers 40 may be mounted to the bottom exterior surface of the bag 38. The mounting of these components may be accomplished by a suitable attachment means, such as epoxy. The aft portions of the fingers 40 may be secured to the bottom of the wet deck 34 by straps 44 so that the fingers retain a generally U-shape as illustrated in FIG. 3. The aft side of the full length flexible panels 42 may be connected to the forward surface of the bag 38 and the forward edges of the fingers 40 by any suitable means, such as epoxy. Alternatively, the connection of the panels 42 to the fingers 40 could be accomplished by stays (not shown) to the fingers or to the bottom side of the wet deck 34 so as to position the bottom ends of the panels 42 in an aft position. The panels 42 extend downwardly across the entire forward surface of both the pneumatic bag 38 and fingers 40 and then beyond the fingers 40 to the plane defined by the bottom of the side hulls 32. A very important feature of the present invention is that the elongated panel 42 overlap one another as illustrated in FIGS. 3 and 4. A satisfactory overlapping has been found to be approximately one-fourth of the width of the panels with each successive panel taking alternate forward and aft positions. It is preferable that a panel be provided for each finger 40, however it is satisfactory to use a panel bridging several of the fingers. It is important that the panels be flexible. Suitable materials for construction of the panels are fiber reinforced plastics, nylon, Teflon, Delrin, etc. The panels should flex and be capable of sliding with respect to one another at points where discrete forces are applied thereto. Upon operation of the vehicle this arrangement will allow the panels to cooperatively flex and slide with respect to one another as they discretely respond to wave actions. The surprising results are improved planing action and reduced drag due to the discrete responses of the panels and minimal wear of the seal because of the protection afforded by the panels.

Figure 5:
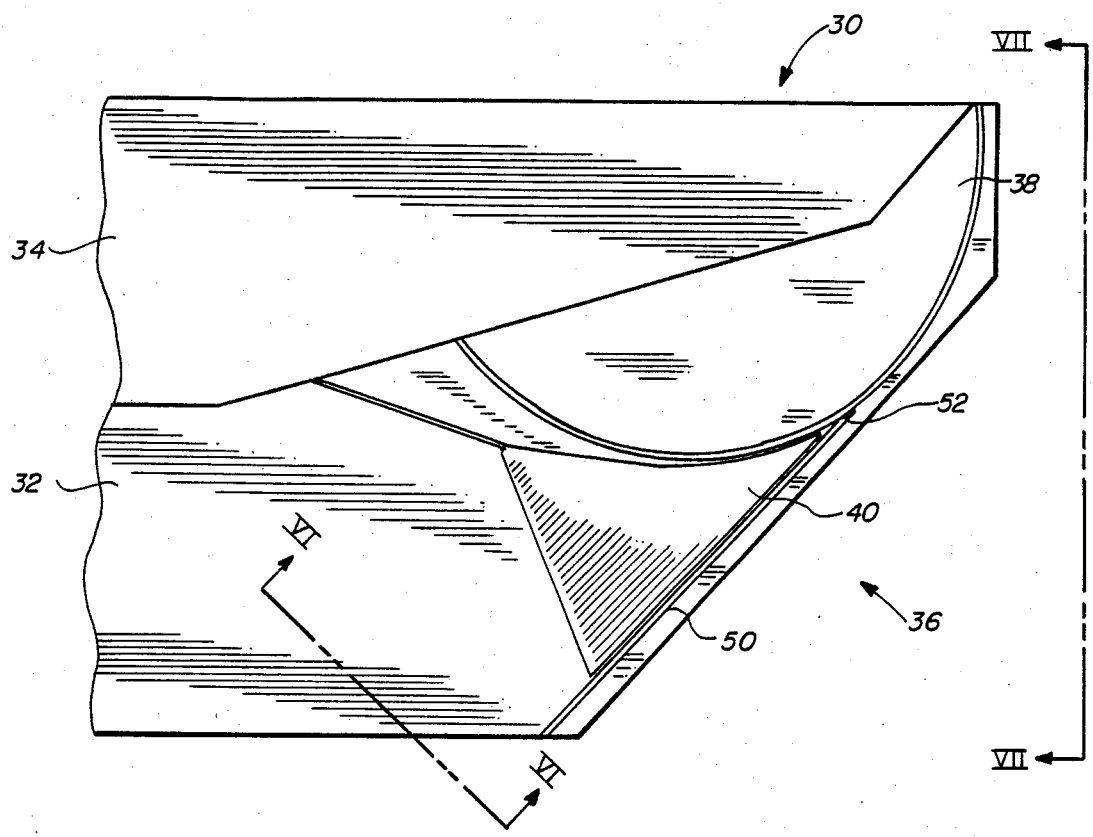
FIG. 5 is a side view of a bow portion of a surface effect vehicle with the starboard side hull removed to illustrate another embodiment of the invention which is a seal which includes a pneumatic bag, fingers and partial length panels.
Figure 6:
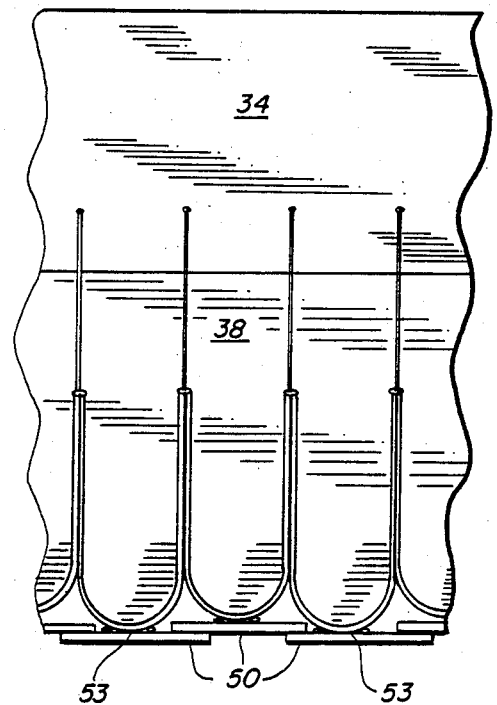
FIG. 6 is a partial view taken along plane VI—VI of FIG. 5.
Figure 7:
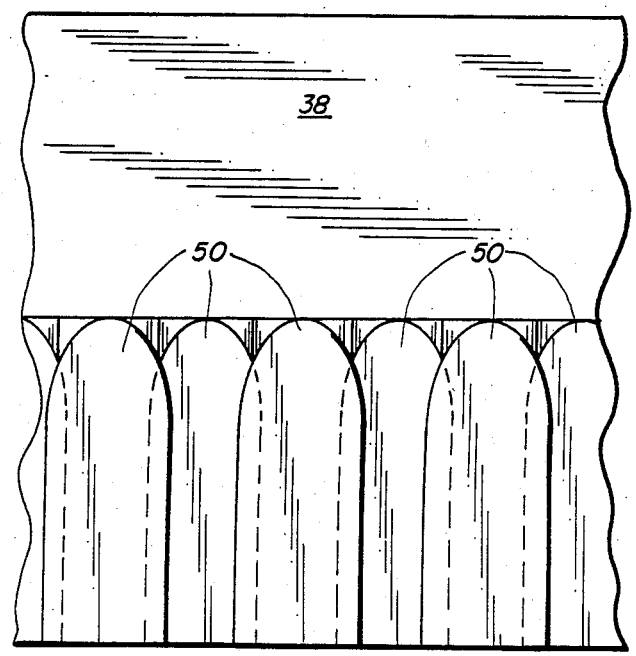
FIG. 7 is a partial view taken along plane VII—VII of FIG. 5.

Another embodiment of the invention is illustrated in FIGS. 5 through 7. This embodimment is identical to the FIG. 2 embodiment except that the top of the panels 50 are located at 52 which is the forward connection of the bag 38 and the fingers 40. With this arrangement the top forward surface portion of the bag 38 is exposed to potential wave action. This should be no problem, however, since wave action will normally be confined to the lower portion of the surface effect vehicle. The advantage of the FIG. 5 embodiment is that the panels 50 will be lighter in weight than the panels 42 of the FIG. 3 embodiment. The backside of the panels 50 may be connected to the forward portions of the fingers 40 at 53 in the same manner as the previous embodiment by any suitable means such as epoxy bonding.

Figure 8:
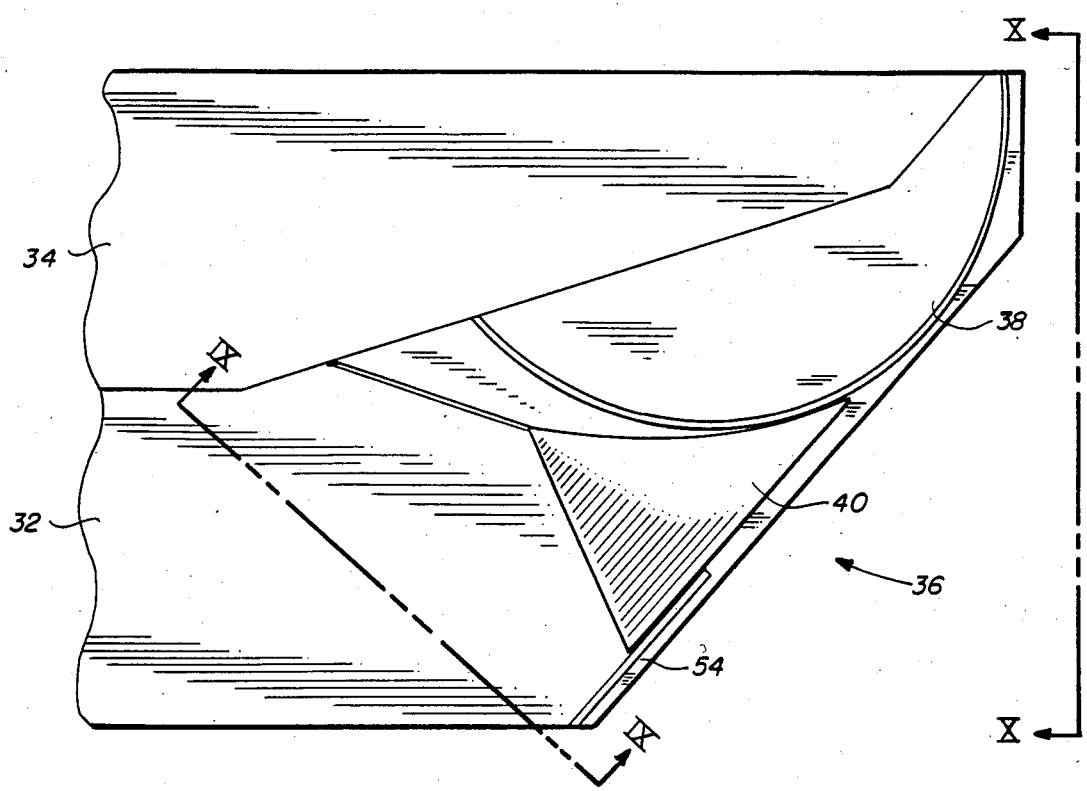
FIG. 8 is a side view of a bow portion of a surface effect vehicle with the starboard side hull removed to illustrate a further embodiment of the invention which is a seal which includes a pneumatic bag, fingers, and partial length panels on the fingers.
Figures 9, 10:
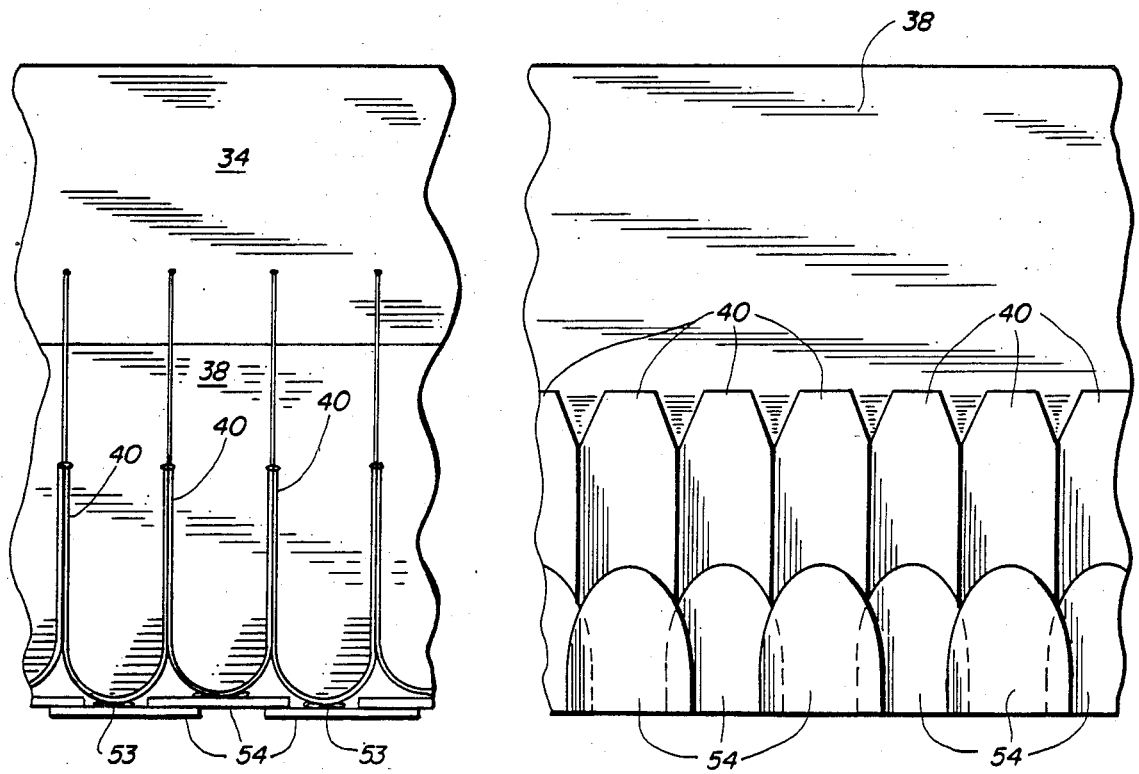
FIG. 9 is a partial view taken along plane IX—IX of FIG.8.
FIG. 10 is a partial view taken along plane X—X of FIG. 8.

A further embodiment of the invention is illustrated in FIGS. 8 through 10 which is identical to the prior embodiments except that the panels 54 are shorter and commence at their top ends at a location intermediate the tops and bottoms of the fingers 40. This embodiment is also illustrated in FIG. 1. The advantage of this embodiment is that the panels 54 are still lighter in weight than the previous embodiments. The panels 54 are connected to the fingers 40 in the same manner as in the previous embodiments, namely by bonding the aft sides of the panels to the forward portions of the fingers 40.

Figure 11:
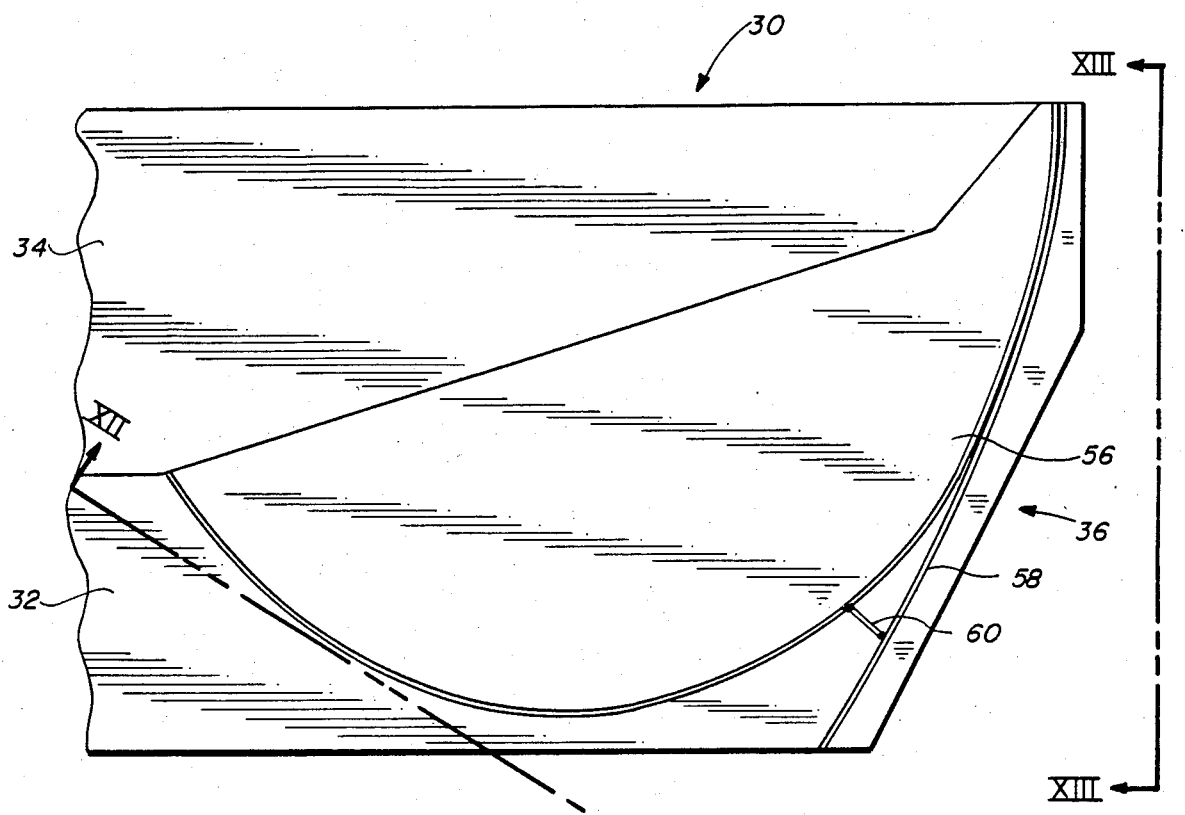
FIG. 11 is a side view of the bow portion of a surface effect vehicle with the starboard side hull removed to illustrate still another embodiment of the invention which is a seal which includes a pneumatic bag and full length panels.
Figure 12:
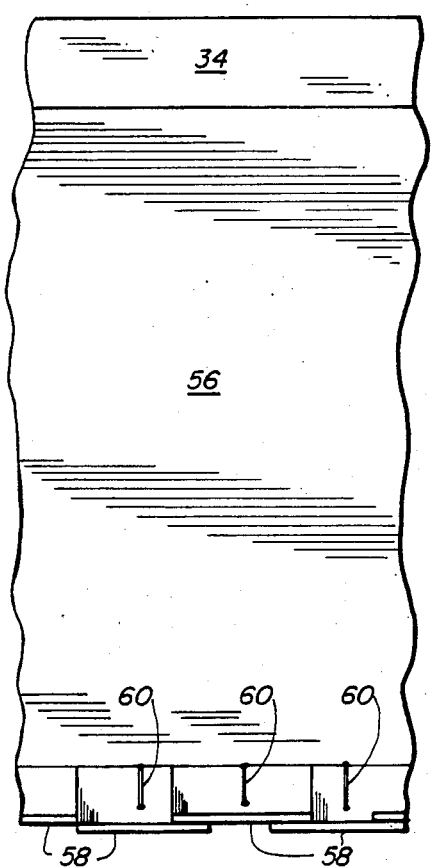
FIG. 12 is a partial view taken along plane XII—XII of FIG. 11.
Figure 13:
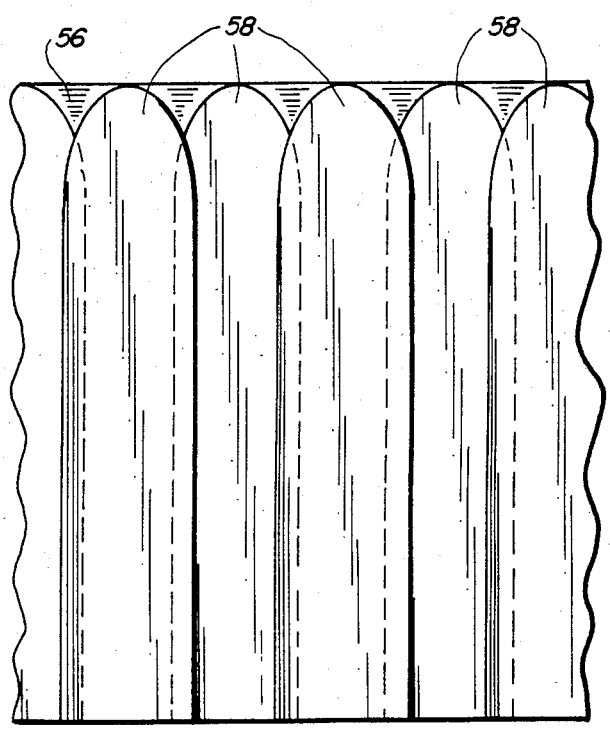
FIG. 13 is a partial view taken along XIII—XIII of FIG. 11.

Still another embodiment of the invention is illustrated in FIGS. 11 through 13 which differs from the prior embodiments in that the fingers 40 have been omitted. This embodiment has a pneumatic bag 56 which is connected to the bottom of the wet deck 34. Full length panels 58 are mounted across the full forward face of the pneumatic bag 56. The top aft side portions of the panels 58 may be bonded to the forward side of the pneumatic bag 56 by any suitable means such as epoxy. The bottom portions of the panels 58 may be kept in an aft position by stays 60 which are connected to the panels and the bag. This embodiment would be especially useful for a stern seal.

Figure 14:
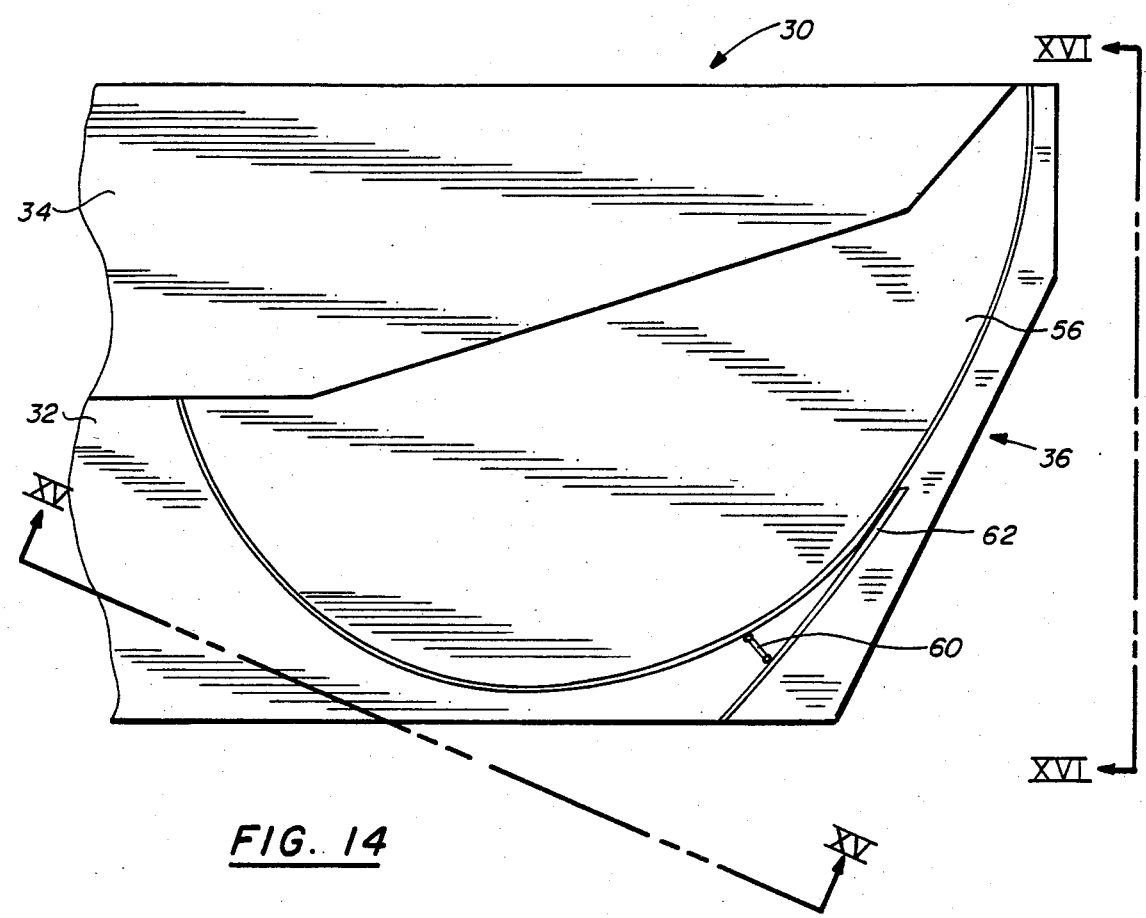
FIG. 14 is a side view of a bow portion of a surface effect vehicle with the starboard side hull removed to illustrate still a further embodiment of the invention which is a seal which includes a pneumatic bag and partial length panels mounted on the bag.
Figure 15:
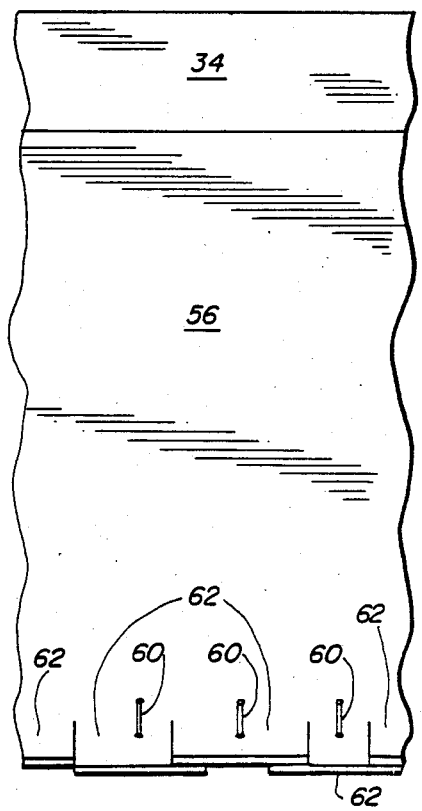
FIG. 15 is a partial view taken along XV—XV of FIG. 14.
Figure 16:
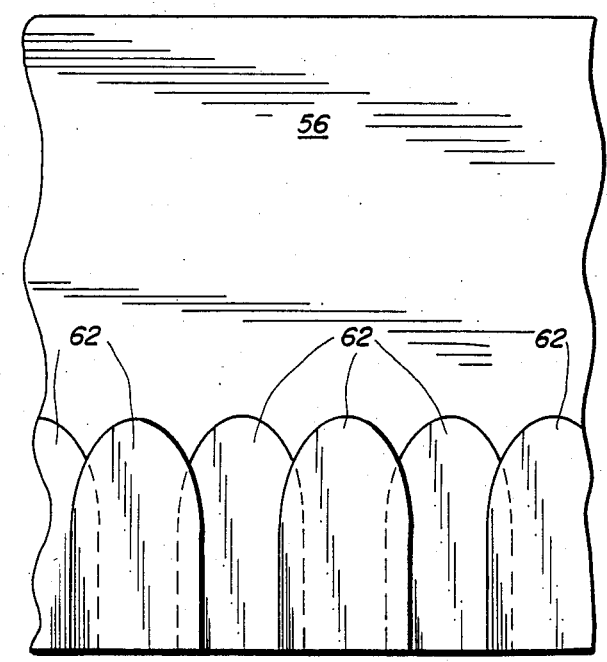
FIG. 16 is a partial view taken along plane XVI—XVI of FIG. 14.

Still a further embodiment of the invention is illustrated in FIGS. 14 through 16 which is identical to the FIG. 11 embodiment except that the panels 62 are shorter in length. The top portions of the panels 62 are mounted to the flexible bag 56 by any suitable means such as bonding at a location intermediate the top and bottom portions of the bag. The bottom ends of the panels 62 may be positioned in an aft position by stays 60. The advantage of the FIG. 14 embodiment over the FIG. 11 embodiment is that the panels 62 have less weight than the panels 60. This embodiment would also be especially useful for a stern seal.

Figure 17:
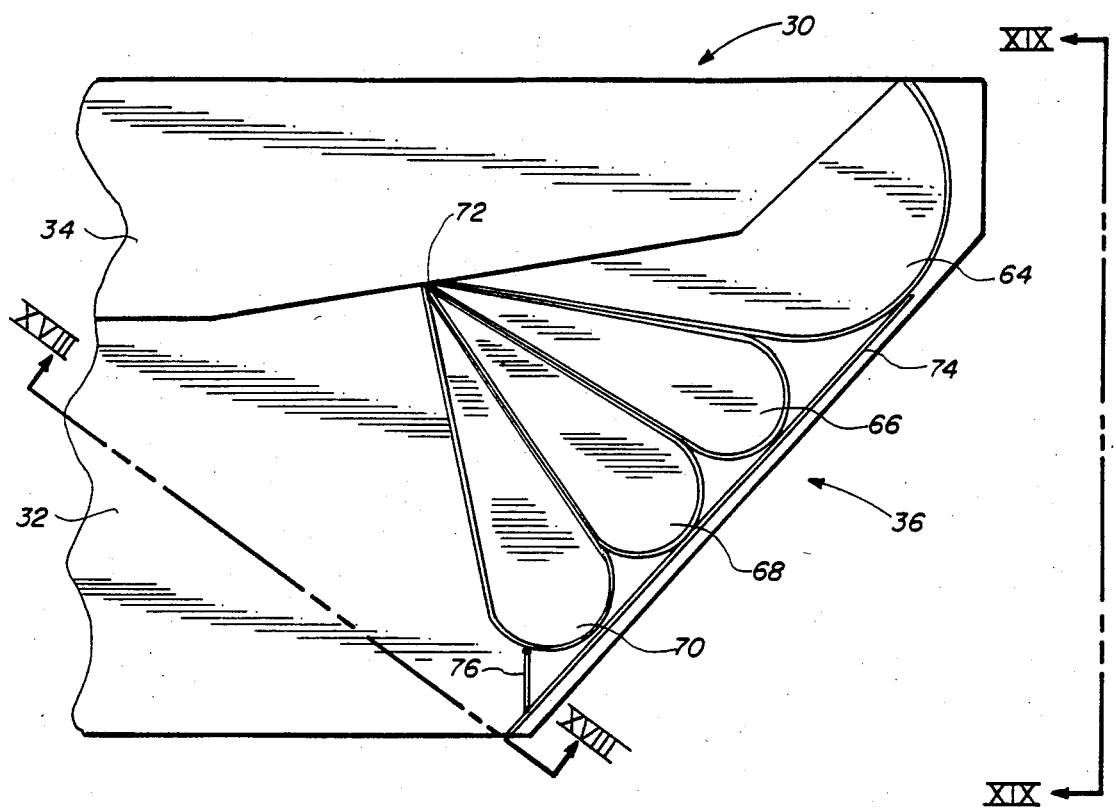
FIG. 17 is a side view of a bow portion of a surface effect vehicle with the starboard side hull removed to illustrate yet another embodiment of the present invention which is a seal which includes a plurality of pneumatic bags and partial length panels mounted thereon.
Figure 18:
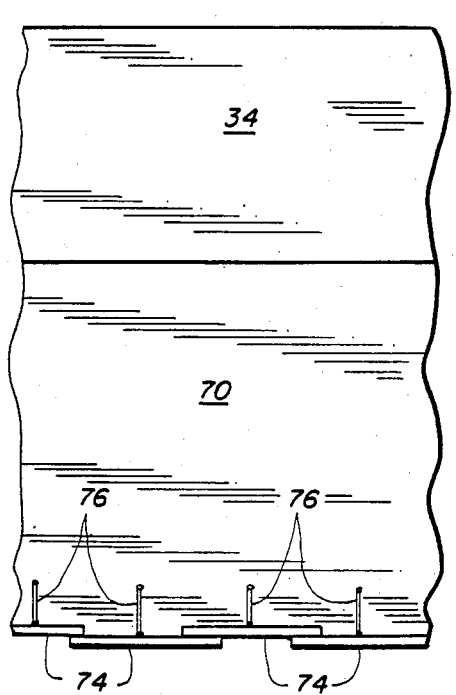
FIG. 18 is a partial view taken along plane XVIII—XVIII of FIG. 17.
Figure 19:
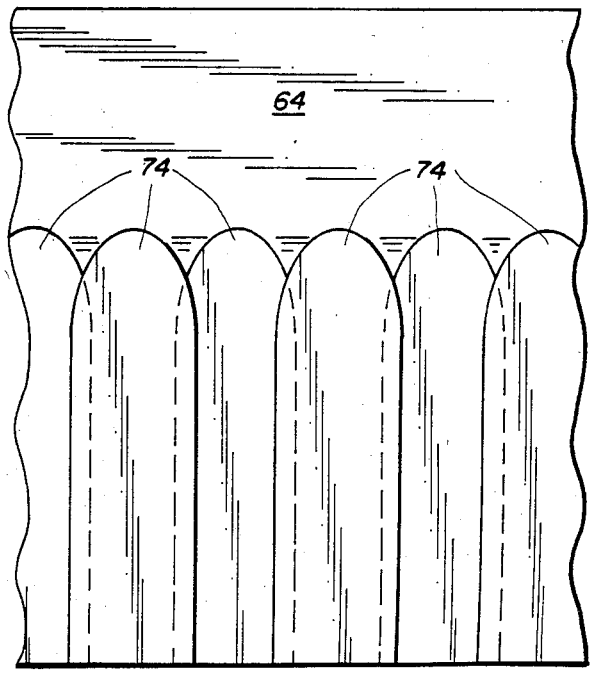
FIG. 19 is a partial view taken along plane XIX—XIX of FIG. 17.

Yet another embodiment of the invention is illustrated in FIGS. 17 through 19. This embodiment is similar to the previous two embodiments except that individual pneumatic bags 64, 66, 68 and 70 are utilized, the bag 64 being connected to the bottom of the wet deck 34 and the bags 64, 66, 68, and 70 being successively connected to each other by any suitable means such as bonding. All of the bags may be connected at a common point 72 to the bottom of the wet deck 34. Panels 74 may be bonded to a bottom portion of the bag 64 and positioned at their bottom ends in an aft direction by stays 76 to the bag 70 or by stays (not shown) to the bottom of the wet deck 34. The FIG. 17 embodiment has the advantage of providing localized pressurized supports for the panels 74, which pressures may be varied as desired.

Figure 20:
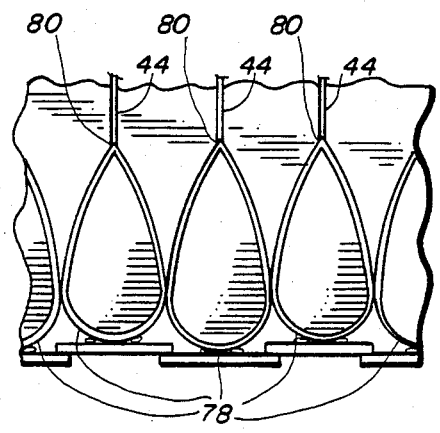
FIG. 20 is a schematic illustration of loops which can be substituted for the fingers illustrated in FIGS. 2 through 10.

FIG. 20 illustrates a variation of the FIGS. 1 through 10 embodiments in that closed loops 78 may be substituted for the fingers 40. These closed loops 78 differ from the fingers in that they are joined together along their aft edges at 80, these aft edges being supported in the positions shown by stays 44 which are connected to the bottom of the wet deck 34.

OPERATION OF THE INVENTION

In all embodiments the seal includes laterally overlapping panels which are positioned over a supporting flexible sheet-like means, such as a pneumatic bag or bags and/or fingers or loops. It is important in all embodiments that the panels extend below the supporting flexible sheet-like means to substantially the plane defined by the bottom of the side hulls 32. With this arrangement the panels intervene between the waves and the cushioning elements of the seal to minimize drag, provide improved planing action, and minimize wear erosion at the lower edge of the seal.

When the seal is forced onto an overrun water surface by irregularities such as waves or by center of gravity shifts of the vehicle the cushioning elements are forced upwardly by the panels. When waves force the panels upwardly, the area over which the panels contact the supporting bags, loops, or fingers increases. The reaction forces provided by these elements to the panels increase to balance the forces acting on the panels from the surface contact. This reaction force reacts on the vehicle as a restoring force to return the vehicle to a load equilibrium condition. As the vehicle returns to equilibrium the wave forces on the panels decrease and the panels move downwardly away from the bag, and loops or fingers relieving the loading on the panels and permitting the seal to reassume its no load geometry. Because of the cooperative flexing and sliding of the panels with respect to one another the loading on the panels and on the vehicle will be considerably less than that of a single panel across the entire forward portion of the vehicle. Also, because of the overlapping configuration of the panels, superior planing action is accomplished since waves cannot intervene between the panels. In essence the panels respond locally to the individual waves where they occur. This means that when a wave of a dimension less than the athwartships dimension of the seal overruns a portion of the panels it is primarily that portion of the panels which responds to the wave and is cushioned by a portion of the bag, loops, and or fingers which, in turn, transmit the forces to the vehicle. It is this overall action that provides a superior planing action and minimizes wear upon the seal.

Obviously, many modifications and variations of the present invention are possible in the light of the above teachings. It is therefore to be understood that within the scope of the appended claims the invention may be practiced otherwise than as specifically described.

What is claimed is:

1. In an air cushion vehicle which has side hulls and a wet deck therebetween, an improved seal comprising:
   flexible sheet like means connected to the wet deck and extending between the side hulls so as to present a forward surface of the vehicle below the wet deck;
   a plurality of elongated flexible panels connected to the air cushion vehicle and extending downwardly across and below the forward surface of the flexible sheet like means; and
   said elongated panels laterally overlapping one another and slidably engaging one another where they overlap so as to provide a continuous sealed barrier across the vehicle,
   whereby upon operation of the vehicle the panels cooperatively flex and slide with respect to one another to discretely respond to wave actions.

2. A seal as claimed in claim 1 including:
   the flexible panels being connected to the air cushion vehicle so as to extend substantially over the entire forward surface of the flexible sheet like means.

3. A seal as claimed in claim 2 wherein:
   the flexible sheet like means includes a pneumatic bag.

4. A seal as claimed in claim 3 wherein:
   the flexible sheet like means further includes a plurality of sheet like fingers connected to the pneumatic bag and extending downwardly therefrom.

5. A seal as claimed in claim 1 including:
   the flexible panels being connected to the flexible sheet like means at a location intermediate the top and bottom ends of the flexible sheet like means.

6. A seal as claimed in claim 5 wherein:
   the flexible sheet like means includes a pneumatic bag.

7. A seal as claimed in claim 6 wherein:
   the flexible sheet like means further include a plurality of sheet like fingers which are connected to the pneumatic bag and which extend downwardly therefrom.

8. A seal as claimed in claim 7 including:
   the flexible panels being connected to the flexible sheet like means at the location of the connection of the sheet like fingers to the pneumatic bag.

9. A seal as claimed in claim 7 including:
   the flexible panels being connected to the sheet like fingers at a location intermediate their tops and bottoms.

10. In an air cushion vehicle which has side hulls and a wet deck therebetween, an improved seal comprising:
    flexible sheet like means connected to the wet deck and extending between the side hulls so as to present a forward surface of the vehicle below the wet deck;
    a plurality of elongated panel means connected to the air cushion vehicle and extending downwardly across and below the forward surface of the flexible sheet like means, and laterally overlapping one another in a slidably engaging relationship for providing a continuous sealed barrier across the vehicle;
    whereby upon operation of the vehicle the plurality of panel means cooperatively flex and slide with respect to one another to discretely respond to wave action 11. A seal as claimed in claim 10 wherein:
    the flexible sheet like means includes a pneumatic bag.

* * * * *